(12) United States Patent
Kaneyoshi et al.

(10) Patent No.: US 10,294,418 B2
(45) Date of Patent: May 21, 2019

(54) COMPLEX FLUORIDE PHOSPHOR AND METHOD FOR PRODUCING SAME

(71) Applicant: SHIN-ETSU CHEMICAL CO., LTD., Tokyo (JP)

(72) Inventors: Masami Kaneyoshi, Echizen (JP); Masatoshi Ishii, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 109 days.

(21) Appl. No.: 15/115,326

(22) PCT Filed: Jan. 15, 2015

(86) PCT No.: PCT/JP2015/050929
§ 371 (c)(1),
(2) Date: Jul. 29, 2016

(87) PCT Pub. No.: WO2015/115195
PCT Pub. Date: Aug. 6, 2015

(65) Prior Publication Data
US 2017/0002263 A1 Jan. 5, 2017

(30) Foreign Application Priority Data

Jan. 30, 2014 (JP) ................................ 2014-015729
Nov. 14, 2014 (JP) ................................ 2014-231476

(51) Int. Cl.
| | | |
|---|---|---|
| C09K 11/61 | (2006.01) | |
| C01G 19/00 | (2006.01) | |
| C01G 23/00 | (2006.01) | |
| C01G 25/00 | (2006.01) | |
| C01G 27/00 | (2006.01) | |
| C01G 17/00 | (2006.01) | |
| C09K 11/67 | (2006.01) | |

(52) U.S. Cl.
CPC .......... C09K 11/617 (2013.01); C01G 17/006 (2013.01); C01G 19/006 (2013.01); C01G 23/002 (2013.01); C01G 25/006 (2013.01); C01G 27/006 (2013.01); C09K 11/675 (2013.01); *C01P 2002/50* (2013.01); *C01P 2002/54* (2013.01); *C01P 2002/84* (2013.01); *C01P 2004/61* (2013.01)

(58) Field of Classification Search
CPC .................................................... C09K 11/617
See application file for complete search history.

(56) References Cited

U.S. PATENT DOCUMENTS

| | | |
|---|---|---|
| 3,576,756 A | 4/1971 | Russo |
| 7,648,649 B2 | 1/2010 | Radkov et al. |
| 8,974,696 B2 | 3/2015 | Kaneyoshi et al. |
| 2010/0142189 A1 | 6/2010 | Hong et al. |
| 2013/0271960 A1 | 10/2013 | Hong et al. |
| 2015/0166887 A1* | 6/2015 | Murphy ............... C09K 11/616 257/98 |

FOREIGN PATENT DOCUMENTS

| | | | |
|---|---|---|---|
| JP | 2009-528429 | A | 8/2009 |
| JP | 2010-209311 | A | 9/2010 |
| JP | 2010-254933 | A | 11/2010 |
| JP | 4582259 | B2 | 11/2010 |
| JP | 2011-12091 | A | 1/2011 |
| JP | 2011012091 | A † | 1/2011 |
| JP | 2012-224536 | A | 11/2012 |
| JP | 2013-14715 | A | 1/2013 |
| JP | 2013014715 | A † | 1/2013 |
| JP | 2013-60506 | A | 4/2013 |

OTHER PUBLICATIONS

International Search Report for PCT/JP2015/050929 dated Apr. 21, 2015.
Written Opinion of the International Searching Authority for PCT/JP2015/050929 (PCT/ISA/237) dated Apr. 21, 2015.
"Inorganic Compound Synthesis III", Shin Jikken Kagaku Kōza 8 [New experimental chemistry series 8] (edited by the Chemical Society of Japan), Maruzen, Inc., 1977, pp. 1166-1167 (2 pgs. with the English translation).
Bode et al., "About a new synthesis of potassium hexafluoromanganate (IV)", Angew. Chem., vol. 65, May 1953, p. 304 (8 pgs. with the English translation).
Cox et al., "Complex Fluorides. Part II. Studies on Fluoroferrates and on Hydrogen Bonding in Complex Fluorides", J. Chem. Soc., Jan. 1954, pp. 1798-1803.
Hoppe et al., "About fluoromanganates of alkali metals1", Magazine of inorganic and general chemistry, vol. 307, 1961, pp. 276-289 (47pgs. with the English translation).
Huss et al., "Manganese, chromium and vanadium complexes", Magazine of inorganic chemistry, vol. 262, 1950, pp. 25-32 (29 pgs. with the English translation).

\* cited by examiner
† cited by third party

*Primary Examiner* — Matthew E. Hoban
(74) *Attorney, Agent, or Firm* — Birch, Stewart, Kolasch & Birch, LLP

(57) ABSTRACT

Provided is a method for producing a phosphor having a chemical composition represented by formula (I), $A_2MF_6$:Mn (I) (A is one type or more of an alkali metal selected from Li, Na, K, Rb, and Cs, and includes at least Na and/or K, and M is one type or more of a tetravalent element selected from Si, Ti, Zr, Hf, Ge, and Sn.), the method comprising preparing a first hydrofluoric acid solution containing M and a second hydrofluoric acid solution containing A as well as either dissolving a compound containing Mn in either the first hydrofluoric acid solution or the second hydrofluoric acid solution or preparing a separate solution in which the compound containing Mn is dissolved. When the solutions are mixed to precipitate the phosphor of the formula (I), the solutions are mixed so that the concentration of M is 0.1 to 0.5 mol/liter when all the solutions are mixed. According to the present invention, a complex fluoride phosphor having excellent luminescence properties can be produced stably with high yield.

5 Claims, No Drawings

COMPLEX FLUORIDE PHOSPHOR AND METHOD FOR PRODUCING SAME

TECHNICAL FIELD

This invention relates to a manganese-activated complex fluoride red phosphor (referred to below as a "complex fluoride phosphor") of the formula $A_2MF_6$:Mn (wherein M is one or more tetravalent element selected from among silicon, titanium, zirconium, hafnium, germanium and tin; and A is one or more alkali metal selected from among lithium, sodium, potassium, rubidium and cesium, and includes at least sodium and/or potassium) that is useful as a red fluoride phosphor for blue LEDs. The invention also relates to a method for producing such a phosphor.

BACKGROUND ART

Red-emitting phosphors that are excited by light corresponding to near-UV to blue light-emitting diodes (LEDs) are needed to improve the color rendering properties of white LEDs or, when white LEDs are used as the backlights in liquid crystal displays, to enhance color reproducibility, and are being studied for this purpose. In particular, JP-A 2009-528429 (Patent Document 1) mentions that complex fluoride phosphors obtained by adding manganese to a complex fluoride of the formula $A_2MF_6$ (wherein A is, for example, Na, K or Rb, and M is, for example, Si, Ge or Ti) are useful.

Patent Document 1 discloses one method for producing such phosphors wherein a hydrofluoric acid solution in which all of the constituent elements have been dissolved or dispersed is concentrated by evaporation, inducing precipitation (evaporative concentration method). Another production process, disclosed in U.S. Pat. No. 3,576,756 (Patent Document 2), is a method wherein hydrofluoric acid solutions in which the respective constituent elements have been separately dissolved are mixed together, following which acetone (a water-soluble organic solvent) is added, lowering the solubility and thereby inducing precipitation (poor solvent addition method). In addition, JP No. 4582259 (Patent Document 3) and JP-A No. 2012-224536 (Patent Document 4) disclose methods wherein the element M and the element A in the above formula are each dissolved in separate hydrofluoric acid-containing solutions, manganese is added to either one of these solutions, and the solutions are mixed together, thereby inducing precipitation of the phosphor (mixing and precipitation method).

The processes for producing the known manganese-doped complex fluoride phosphors of the formula $A_2MF_6$ (wherein A is, for example, Na, K or Rb; and M is, for example, Si, Ge or Ti) mentioned above can be applied to small-volume synthesis in the laboratory. However, carrying out these processes industrially on a large scale will require further investigation. Even in the case of methods, among those already known, which are based on the mixture of aqueous solutions (Patent Documents 3 and 4) and are thought to be highly suitable for mass production, production operations with actual industrial production equipment in mind are still under investigation.

In particular, in the evaporative concentration method, the product purity is inadequate, and in the poor solvent addition method, fine particles having a poor crystallinity tend to form. For these and other reasons, phosphors produced by either of these methods have lacked satisfactory emission characteristics. For these reasons, the mixing and precipitation method appears to be a more improved method, although the detailed conditions are still under investigation. There are cases in which, depending on the concentration and composition of the reaction liquid in particular, sufficient characteristics cannot be obtained, or in which, for reasons having to do with solubility, precipitation itself does not arise.

Also, in recent years there has been a technical call for increasing the luminous flux per white LED device, and the amount of current passed through LED chips is being increased for this purpose. However, when this is done, the temperature of the phosphor used ends up rising, as a result of which the phenomenon of decreased light emission by the phosphor may occur. Phosphors of poor crystallinity that are produced by the conventional methods described above undergo a particularly large decrease in emission characteristics at such elevated temperatures, prompting a desire for improvement.

SUMMARY OF THE INVENTION

Problems to be Solved by the Invention

Accordingly, one object of this invention is to provide a complex fluoride phosphor which has excellent emission characteristics and for which the emission characteristics are good even at high temperatures. Another object of the invention is to provide a complex fluoride phosphor production method which is capable of stably and efficiently producing such a phosphor.

Means for Solving the Problems

In order to achieve these objects, the inventors have carried out extensive investigations on the conditions of phosphor production by the mixing and precipitation method, particularly the composition and concentration of the reaction liquid, ultimately arriving at the present invention.

Accordingly, the invention provides the following method for producing a complex fluoride phosphor.

[1] A method for producing a complex fluoride phosphor having a chemical composition of the formula (I):

$$A_2MF_6\text{:Mn} \qquad (I)$$

wherein A is one or more alkali metal selected from the group consisting of lithium, sodium, potassium, rubidium and cesium, and includes at least sodium and/or potassium, and M is one or more tetravalent element selected from the group consisting of silicon, titanium, zirconium, hafnium, germanium and tin, the method comprising the steps of:

providing a first hydrofluoric acid solution which contains M and a second hydrofluoric acid solution which contains A, dissolving a manganese-containing compound in either of the first hydrofluoric acid solution and the second hydrofluoric acid solution or separately preparing a solution in which a manganese-containing compound is dissolved, and mixing together the solutions so as to precipitate the phosphor of formula (I) such that the concentration of M, when the solutions are completely mixed, is at least 0.1 mol/L and not more than 0.5 mol/L.

[2] The production method of [1], wherein a manganese-containing compound is dissolved in the M-containing first hydrofluoric acid solution, and the A-containing second hydrofluoric acid solution is added to the first solution.

[3] The production method of [1] or [2], wherein the amount of A when the solutions are completely mixed, expressed as a molar ratio with respect to the sum of M and manganese, is at least 2.5.

[4] The production method of any one of [1] to [3], wherein the proportion of hydrogen fluoride, when the solutions are completely mixed, is at least 20 wt % and not more than 60 wt % of the overall mixture.

[5] The production method of any one of [1] to [4], wherein the phosphor of formula (I) has an emission intensity at 130° C. that is at least 90% of the emission intensity at 20° C.

[6] A complex fluoride phosphor having a chemical composition of the formula (I):

$$A_2MF_6:Mn \qquad (I)$$

(wherein A is one or more alkali metal selected from the group consisting of lithium, sodium, potassium, rubidium and cesium, and includes at least sodium and/or potassium, and M is one or more tetravalent element selected from the group consisting of silicon, titanium, zirconium, hafnium, germanium and tin), which phosphor has an emission intensity at 130° C. which is at least 90% of the emission intensity at 20° C.

[7] The phosphor of [6], wherein M is silicon.

Advantageous Effects of the Invention

This invention makes it possible to stably and efficiently produce a complex fluoride phosphor that is endowed with excellent emission characteristics and has good emission characteristics even at high temperatures.

EMBODIMENT FOR CARRYING OUT THE INVENTION

The inventive method for producing a complex fluoride is a method for obtaining a complex fluoride phosphor of formula (I) below

$$A_2MF_6:Mn \qquad (I)$$

(wherein M is one or more tetravalent element selected from the group consisting of Si, Ti, Zr, Hf, Ge and Sn; and A is one or more alkali metal selected from the group consisting of Li, Na, K, Rb and Cs, and includes at least Na and/or K).

Here, M is preferably Si, Ti or Ge, with Si or Ti being especially preferred, and A is preferably Na or K.

In this invention, first of all, a first hydrofluoric acid solution containing a tetravalent element M (wherein M is one or more tetravalent element selected from among Si, Ti, Zr, Hf, Ge and Sn) is prepared.

The first solution is prepared by dissolving an M-containing compound, such as a fluoride, oxide, hydroxide or carbonate of M, in a hydrofluoric acid-containing aqueous solution. At this time, the hydrofluoric acid is used in an excess of the amount required for dissolution. Specifically, the hydrofluoric acid concentration is preferably from 10 to 60 wt %, and especially from 20 to 50 wt %. Illustrative examples of sources of M at this time include $SiO_2$ and $TiO_2$. When these are dissolved in water together with an aqueous solution of hydrofluoric acid, the solution that forms is substantially an aqueous solution containing a polyfluoro acid salt of the element M. Alternatively, a solution of a polyfluoro acid salt such as $H_2SiF_6$ may be acquired and used. In such a case, these aqueous solutions of polyfluoro acid salts are mixed with an aqueous solution of hydrofluoric acid.

In a separate operation, a second hydrofluoric acid solution containing an alkali metal A (wherein A is one or more selected from among Li, Na, K, Rb and Cs, and is preferably Na and/or K) is prepared.

The second solution can be prepared by dissolving a compound of A selected from among, for example, fluorides (AF), hydrogenfluorides ($AHF_2$), nitrates ($ANO_3$), sulfates ($A_2SO_4$), hydrogensulfates ($AHSO_4$), carbonates ($A_2CO_3$), bicarbonates ($AHCO_3$) and hydroxides (AOH) in an aqueous solution of hydrofluoric acid. In the case of a hydrogenfluoride, dissolution in water alone is acceptable because hydrogen fluoride (HF) dissolves out at the time of dissolution. The hydrofluoric acid concentration is preferably from 5 to 60 wt %, and especially from 10 to 50 wt %.

A manganese-containing compound such as a fluoride, carbonate, oxide or hydroxide of manganese may be dissolved in hydrofluoric acid and used as the manganese serving as the luminescence center element. From the standpoint of the oxidation state of manganese and their ready solubility, the use of complex fluorides of the formula $A_2MnF_6$ and complex oxides of the formula $A_2MnO_3$ is preferred. An illustrative example is $K_2MnF_6$.

Manganese may be added by either of the following methods: addition to either the first or the second solution or, when the first and second solution are to be mixed together, separate addition as a solution. Addition to the first solution prior to mixture of the first solution with the second solution is preferred.

The concentration of M when everything has been mixed together must be at least 0.1 mol/L and not more than 0.5 mol/L. When this is less than 0.1 mol/L or more than 0.5 mol/L, the emission characteristics of the resulting phosphor may be inadequate. Also, at less than 0.1 mol/L, the phosphor yield is poor, whereas at more than 0.5 mol/L, the viscosity of the liquid when precipitation has occurred rises excessively, which may make the reaction operation difficult to carry out. The concentration is more preferably from 0.12 to 0.4 mol/L, and most preferably from 0.13 to 0.35 mol/L.

To ultimately achieve this concentration, although the liquid amounts of the first solution and the second solution also play a part, it is preferable for the concentration of M in the first solution to be from 0.1 to 1.5 mol/L.

The amount of A when everything has been mixed together must be such that the molar ratio of A with respect to the sum of M and manganese is at least 2.5. At less than 2.5, the solubility of the complex fluoride may increase and the yield may decrease, or a precipitate may not be obtained. The molar ratio is preferably at least 2.7 and not more than 5, and more preferably at least 2.8 and not more than 4. Although this A/(M+Mn) ratio has substantially no upper limit, there is nothing to be gained by increasing the ratio above 5. Also, the proportion of manganese in M+Mn is preferably from 0.1 to 20 mol %, and more preferably from 0.3 to 10 mol %.

To achieve this ratio between A and (M+Mn), although the liquid amounts of the first solution and the second solution also play a part, it is preferable for the concentration of A in the second solution to be from 0.25 to 10 mol/L.

Hydrogen fluoride (HF) must be present in the reaction liquid. The hydrogen fluoride concentration is preferably at least 20 wt % and not more than 60 wt %. The concentration is more preferably from 25 to 50 wt %. At a hydrogen fluoride concentration below 20 wt %, the hydrolysis or reduction of manganese complex ions arises, as a result of which the emission characteristics may worsen. On the other hand, a hydrogen fluoride of more than 60 wt % is undesirable from the standpoint of stability.

The temperature of the first solution, the second solution and also of the solution following mixture may be any temperature in the range of at least −10° C. and not more than 100° C. A temperature of from 0 to 40° C. is especially preferred. The temperature may be adjusted by carrying out heating, or by carrying out cooling that takes into account the degree to which the temperature rises on account of heat generation during liquid preparation and mixture of the first and second solutions.

Any suitable method may be used to mix together the first and the second solutions and thereby effect the precipitate-forming reaction, such as stirring one solution with a stirrer and pouring the other solution therein, circulating one solution and having the other solution flow therein, or mixing together the two solutions while having them both flow at the same time. A method for which the reaction apparatus is simple, which is easy to carry out, and which moreover results in a satisfactory product performance is that of stirring the first solution while pouring in the second solution. The reaction time for this mixing operation is generally from 10 seconds to one hour, and preferably from 20 seconds to 20 minutes.

The phosphor obtained as a precipitate due to the reaction may be solid-liquid separated and removed by a method such as filtration, centrifugal separation or s decantation. Following solid-liquid separation, if necessary, treatment such as washing or solvent displacement may be carried out. In addition, drying by vacuum drying or the like may be carried out.

The phosphor obtained by the production method of the invention is a complex fluoride phosphor in which manganese serves as the luminescence center, and which is red-emitting when excited with blue light (at 400 to 480 nm, such as at 450 nm). It has an emission spectrum with a maximum intensity peak at about 630 nm and is composed of several sharp linewidth peaks. When produced under standard conditions within the range of this invention, the absorptance of 450 nm light is at least 0.6, preferably from 0.63 to 0.85, and the internal quantum efficiency is at least 0.8, preferably from 0.83 to 0.93, making it suitable as a red phosphor for white LEDs that use blue LEDs as their excitation source.

Also, it is possible with the production method of the invention to obtain a complex fluoride phosphor that has an emission intensity at 130° C. which is at least 90%, and especially at least 95%, of the emission intensity at 20° C. In particular, when M in Formula (I) is silicon, the emission intensity characteristics at such high temperatures are excellent.

Measurement of the emission intensity is described in subsequently described Experimental Example 2.

EXAMPLES

The invention is illustrated more fully below by way of Examples and Comparative Examples, although these Examples are not intended to limit the invention. Examples 1 and 2 are examples of $K_2SiF_6$:Mn, and Example 3 is an example of $K_2TiF_6$:Mn.

Reference Examples

[Preparation of $K_2MnF_6$]

Preparation was carried out by the following method, in general accordance with the method described in *Shin Jikken Kagaku K•za* 8 [New experimental chemistry series 8] (edited by The Chemical Society of Japan): "Inorganic Compound Synthesis III," p. 1166 (Maruzen, Inc., 1977) (Non-Patent Document 1).

An ion-exchange membrane partition (diaphragm) made of fluoropolymer was provided at the center of a polyvinyl chloride reactor, and an anode and a cathode, each composed of a platinum sheet, were provided in the two chambers on either side of the ion-exchange membrane. An aqueous solution of hydrofluoric acid having manganese(II) fluoride dissolved therein was placed on the anode side of the reactor, and an aqueous solution of hydrofluoric acid was placed on the cathode side. Both electrodes were connected to a power supply, and electrolysis was carried out at a voltage of 3V and a current of 0.75 A. Following the completion of electrolysis, a saturated solution of potassium fluoride in aqueous hydrofluoric acid was added in excess to the reaction liquid on the anode side. The yellow solid product that formed was separated off by filtration and collected, giving $K_2MnF_6$.

Example 1

First, 234 cm³ of a 40 wt % solution of fluorosilicic acid ($H_2SiF_6$) in water (Morita Chemical Industries Co., Ltd.) was mixed with 2,660 cm³ of 50 wt % hydrofluoric acid (HF) (SA-X, from Stella Chemifa Corporation). Next, 13.32 g of the $K_2MnF_6$ powder prepared beforehand by the method in the reference example was added to the mixture and dissolved therein by stirring (first solution: Si—F—Mn).

In a separate operation, 210.5 g of potassium hydrogenfluoride ($KHF_2$, from Stella Chemifa Corporation) was mixed with 680 cm³ of a 50 wt % aqueous solution of hydrofluoric acid and 1,270 cm³ of pure water and thereby s dissolved (second solution: K—H—F).

While stirring the first solution at room temperature (16° C.) using a stirring blade and a motor, the second solution (15° C.) was added a little at a time over a period of 1 minute 30 seconds. The liquid temperature became 26° C., giving a light orange-colored precipitate ($K_2SiF_6$:Mn). Stirring was continued for another 10 minutes, after which this precipitate was separated off by filtration with a Büchner funnel and drained of liquid as much as possible. In addition, the precipitate was washed with acetone, drained and vacuum dried, giving 183.0 g of a $K_2SiF_6$:Mn powder product.

Calculating from the charged amounts of the starting materials used in the reactions up to this point, the silicon concentration in the overall liquid following mixture was 0.182 mole/L, K/(Si+Mn)=2.83 (molar ratio), and the amount of hydrogen fluoride was 34.9 wt % of the overall mixture.

The particle size distribution of the resulting powder product was measured with a flow dispersion-type laser diffraction particle size analyzer (Helos and Rodos, from Sympatec GmbH). As a result, particles having a size of 8.8 μm or less accounted for 10% of the total volume ($D_{10}$=8.8 μm), particles having a size of 19.4 μm or less accounted for 50% of the total volume ($D_{50}$=19.4 μm), and particles having a size of 29.6 μm or less accounted for 90% of the total volume ($D_{90}$=29.6 μm).

Example 2

Aside from setting the amount of 50 wt % HF to 1,110 cm³ and the amount of water to 910 cm³ during preparation of the second solution, the respective starting materials were weighed out and furnished in the same way as in Example 1. The first solution and the second solution were each placed in a plastic container having a screw-on lid and were cooled to 7° C. by being set, together with their respective containers, in an ice water bath.

At this point, reaction was effected in the same way as in Example 1. While stirring the first solution, the second solution was poured therein over a period of 1 minute 30 seconds. The temperature of the liquid became 14° C., and a light orange-colored precipitate formed. Stirring was continued for 10 minutes more, after which the precipitate was separated off by filtration with a Büchner funnel, and drained of liquid as much as possible. In addition, the precipitate was washed with acetone, drained and vacuum dried, giving 182.3 g of a $K_2SiF_6$:Mn powder product.

Calculating from the charged amounts of the starting materials used in the reactions up to this point, the silicon concentration in the overall liquid following mixture and K/(Si+Mn) were the same as in Example 1, and the amount of hydrogen fluoride was 39.5 wt % of the overall mixture.

The particle size distribution results measured in the same way as in Example 1 were as follows: $D_{10}$=13.6 μm, $D_{50}$=32.1 μm; $D_{90}$=50.8 μm. [Example 3]

First, 436 cm³ of a 40 wt % solution of 40 wt % hexafluorotitanic acid ($H_2TiF_6$) in water (Morita Chemical Industries Co., Ltd.) was mixed with 2,458 cm³ of 50wt % HF. Next, 14.8g of the same $K_2MnF_6$ powder as in Example 1 was added to the mixture and dissolved therein by stirring (first solution: Ti—F—Mn).

In a separate operation, 468.6g of $KHF_2$ was mixed with 1,910 cm³ of pure water and thereby dissolved (second solution: K—H—F).

As in Example 2, both solutions were placed, together with their respective containers, in an ice-water bath and cooled to 10° C.

While stirring the first solution using a stirring blade and a motor, the second solution was added a little at a time over a period of 1minute 35seconds. The liquid temperature became 22° C., and a light orange-colored precipitate ($K_2TiF_6$:Mn) formed. Stirring was continued for another 10 minutes, after which the precipitate was separated off by filtration with a Büchner funnel and drained of liquid as much as possible. In addition, the precipitate was washed with acetone, drained and vacuum dried, giving 250.2g of a $K_2TiF_6$:Mn powder product.

Calculating from the charged amounts of the starting materials used in the reactions up to this point, the titanium concentration in the overall liquid following mixture was 0.297mole/L, K/(Ti+Mn) =3.85(molar ratio), and the amount of hydrogen fluoride was 25.8wt % of the overall mixture.

The particle size distribution results measured in the same way as in Example 1were as follows: $D_{10}$ =17.2 μm, $D_{50}$ = 57.3μm; $D_{90}$ =113.5μm.

Comparative Example 1

First, 26.1 cm³ of a 40 wt % $H_2SiF_6$ solution was mixed with 975 cm³ of 50 wt % HF. Next, 1.48 g of the same $K_2MnF_6$ powder as in Example 1 was added to the mixture and dissolved therein by stirring (first solution: Si—F—Mn).

In a separate operation, 17.38 g of $KHF_2$ was dissolved in 500 cm³ of 50% HF (second solution: K—H—F).

While stirring the first solution at room temperature (19° C.) using a stirring blade and a motor, the second solution (18° C.) was added a little at a time over a period of 1 minute 15 seconds. The liquid temperature became 21° C. Stirring was continued for another 20 minutes, but precipitation did not occur.

Calculating from the charged amounts of the starting materials used in the reactions up to this point, the silicon concentration in the overall liquid following mixture was 0.071 mole/L, K/(Si+Mn)=2.1 (molar ratio), and the amount of hydrogen fluoride was 48.6 wt % of the overall mixture.

Comparative Example 1A

Acetone (guaranteed reagent from Wako Pure Chemical Industries), 800 cm³, was added over 5 minutes from a s dropping funnel to the mixture from Comparative Example 1 in which precipitate did not form, under stirring of the mixture. A precipitate formed, and the liquid ultimately reached a temperature of 28° C. The precipitate was separated off by filtration, washed with acetone and vacuum dried, giving 13.88 g of a powder product. The particle size distribution results measured in the same way as in Example 1 were as follows: $D_{10}$=0.58 μm, $D_{50}$=1.52 μm; $D_{90}$=3.16 μm.

Comparative Example 2

First, 261 cm³ of a 40 wt % $H_2SiF_6$ solution was mixed with 740 cm³ of 50 wt % HF. Next, 14.8 g of the same $K_2MnF_6$ powder as in Example 1 was added to the mixture and dissolved therein by stirring (first solution: Si—F—Mn).

In a separate operation, 173.8 g of $KHF_2$ was dissolved in 500 cm³ of 50% HF (second solution: K—H—F).

While stirring the first solution at room temperature (17° C.) using a stirring blade and a motor, the second solution (16° C.) was added a little at a time over a period of 1 minute 15 seconds. The liquid temperature became 21° C., and a light orange-colored precipitate formed. After continuing to stir for another 10 minutes, the precipitate was separated off by filtration with a Büchner funnel and drained of liquid as much as possible. The precipitate was then washed with acetone, drained and vacuum dried, giving 206.7 g of a powder product.

Calculating from the charged amounts of the starting materials used in the reactions up to this point, the silicon concentration in the overall liquid following mixture was 0.706 mole/L, K/(Si+Mn)=2.1 (molar ratio), and the amount of hydrogen fluoride was 37.6 wt % of the overall mixture.

The particle size distribution results measured in the same way as in Example 1 were as follows: $D_{10}$=10.9 μm, $D_{50}$=25.4 μm; $D_{90}$=37.8 μm.

Experimental Example 1

The emission characteristics, emission spectra, absorptances and quantum efficiencies of the phosphors obtained in the Examples and the Comparative Examples were measured using the QE1100 Quantum Efficiency Measurement System (Otsuka Electronics Co., Ltd.). The absorptances and quantum efficiencies at an excitation wavelength of 450 nm are shown in Table 1.

TABLE 1

|  | Absorptance | Internal quantum efficiency |
| --- | --- | --- |
| Example 1 | 0.647 | 0.862 |
| Example 2 | 0.715 | 0.870 |
| Example 3 | 0.748 | 0.818 |
| Comparative Example 1A | 0.465 | 0.470 |
| Comparative Example 2 | 0.642 | 0.653 |

Experimental Example 2

The change with temperature in the emission characteristics of the phosphors obtained in the Examples and Comparative Examples were measured. An FP-6500 spectrofluorometer (JASCO Corporation) was used. Measurement was carried out by using a sampler holder having a portion where light enters and exits that is made of quartz glass and other portions of which are made of metal so as to enable heating under temperature control by bringing the metallic portion into contact with a heater. The emission spectra at room temperature (20° C.) and 130° C. were measured by excitation with 450 nm light (slit width for excitation light, 5 nm).

The results are shown in Table 2. The emission intensity is given as an integrated value for the range of 550 nm to 700 nm in the fluorescence spectrum (scanned at 50 nm/min, with readings taken at 0.2 nm intervals).

TABLE 2

|  | Fluorescence intensity at 20° C. (A) | Fluorescence intensity at 130° C. (B) | Intensity ratio B/A |
|---|---|---|---|
| Example 1 | 1,297.1 | 1,261.1 | 0.975 |
| Example 2 | 1,441.3 | 1,400.9 | 0.972 |
| Example 3 | 1,425.1 | 1,264.1 | 0.887 |
| Comparative Example 1A | 508.5 | 409.8 | 0.806 |
| Comparative Example 2 | 973.8 | 842.3 | 0.865 |

Although some preferred embodiments of the invention have been described above, the invention is not limited thereby, various modifications such as other embodiments, additions, deletions and substitutions being possible within a range conceivable by those skilled in the art, insofar as all such variations exhibit the operation and advantageous effects of the invention and are encompassed within the scope of the invention.

The invention claimed is:

1. A method for producing a complex fluoride phosphor having a chemical composition of the formula (I):

$$A_2MF_6{:}Mn \quad (I)$$

wherein A is one or more alkali metal selected from the group consisting of lithium, sodium, potassium, rubidium and cesium, and includes at least sodium and/or potassium, and M is one or more tetravalent element selected from the group consisting of silicon, titanium, zirconium, hafnium, germanium and tin, the method comprising the steps of:

providing a first hydrofluoric acid solution which contains M and a second hydrofluoric acid solution which contains A, dissolving a manganese-containing compound in either of the first hydrofluoric acid solution and the second hydrofluoric acid solution or separately preparing a solution in which a manganese-containing compound is dissolved, and mixing together the solutions so as to precipitate the phosphor of formula (I) such that the concentration of M, when the solutions are completely mixed, is at least 0.1 mol/L and not more than 0.5 mol/L, wherein the amount of A when the solutions are completely mixed, expressed as a molar ratio with respect to the sum of M and manganese, is at least 2.8.

2. The production method of claim 1, wherein a manganese-containing compound is dissolved in the M-containing first hydrofluoric acid solution, and the A-containing second hydrofluoric acid solution is added to the first solution.

3. The production method of claim 1, wherein the amount of A when the solutions are completely mixed, expressed as a molar ratio with respect to the sum of M and manganese, is not more than 5.

4. The production method of claim 1, wherein the proportion of hydrogen fluoride, when the solutions are completely mixed, is at least 20 wt % and not more than 60 wt % of the overall mixture.

5. The production method of claim 1, wherein the phosphor of formula (I) has an emission intensity at 130° C. that is at least 90% of the emission intensity at 20° C.

* * * * *